United States Patent Office 3,752,740
Patented Aug. 14, 1973

3,752,740
PROCESS FOR PRODUCING β-CAROTENE
Oldrich K. Sebek, Kalamazoo, Mich., assignor to The Upjohn Company, Kalamazoo, Mich.
No Drawing. Filed Jan. 22, 1964, Ser. No. 339,331
Int. Cl. C12d 5/00
U.S. Cl. 195—28 R                            3 Claims

ABSTRACT OF THE DISCLOSURE

A process for producing increased titers of β-carotene which comprises fermenting *Blakeslea trispora* in an aqueous fermentation medium containing at least 7½% citrus molasses.

---

This invention relates to an improved method for the production of β-carotene by the fermentation of *Blakeslea trisopora* in an aqueous fermentation medium. More particularly, this invention relates to the discovery that high titers of β-carotene can be obtained by submerged aerobic fermentation of *Blakeslea trispora* using a novel fermentation medium containing at least 7½% citrus molasses.

β-Carotene has been obtained in media known in the art by means of *Blakeslea trispora*. For example, U.S. Pat. 3,079,380 discloses a medium for β-carotene. Citrus molasses is disclosed as being a valuable nutrient when used in levels below 5%.

While engaged in a study of synthesizing β-carotene by *Blakeslea trispora*, I discovered a novel fermentation medium which contains at least 7½% citrus molasses. My novel β-carotene fermentation medium gives 40% and higher titers of β-carotene than any prior art medium known and tested by me.

Citrus molasses is a by-product of the citrus industry and contains approximately 72% solids in its marketable form. It is obtained from whole citrus peel by treating the peel with alkali, such as lime, and then pressing out the aqueous molasses from the peel.

My invention is a novel β-carotene fermentation medium containing at least 7½% citrus molasses and, also, the use of at least 7½% citrus molasses in prior art β-carotene fermentation media. For example, the fermentation medium and conditions in U.S. Pat. 3,079,380 can be used where the citrus molasses is substituted for the aqueous extract of citrus meal, as in Example 2.

The titer of β-carotene in the fermentation broth can be determined by assay procedures disclosed in U.S. Pat. 3,079,380, Example 1 and U.S. Pat. 3,025,221, Example 1.

The following examples are illustrative of the medium and process of the present invention, but are not to be construed as limiting. Unless otherwise specified, parts and percentages are by weight.

EXAMPLE 1

β-Carotene fermentation medium CM-1

A series of 500 ml. flasks, each containing 100 ml. of fermentation medium CM-1 or the medium disclosed in U.S. Pat. 3,079,380, Example 1, was prepared and inoculated using the procedure disclosed in Example 1 of U.S. Pat. 3,079,380. The results are shown in Table I.

MEDIUM CM-1

| | |
|---|---|
| Soybean meal (non-hydrolyzed) | g./l.  25 |
| Citrus molasses | g./l. 120 |
| Cornsteep liquor | g./l.  20 |
| Cotton seed oil | m./l.  50 |
| Deobase [1] | m./l.  50 |

Water, q.s. to 1 liter (adjust to pH 6.0–7.5 with NaOH before sterilization).

[1] Sonneborn and Sons T.M. for deodorized kerosene as disclosed in U.S. Pat. 3,025,221.

TABLE I

| Medium disclosed in U.S. Pat. 3,079,380, Example 1: | Fermentation medium CM-1 |
|---|---|
| Mg.-β-carotene 912 | 1740 |

EXAMPLE 2

The conditions, inoculum, and medium examployed in U.S. Pat. 3,079,380, Example 2, were followed, except that the citrus molasses was varied to much higher levels. The results are shown in Table II.

TABLE II

| Citrus Molasses: | Titer of β-carotene, mg./l. |
|---|---|
| 0% | 10 |
| .1% | 10 |
| 1% | 13 |
| 5% | 68 |
| 7% | 118 |
| 8% | 126 |
| 12% | 172 |
| 14% | 245 |
| 16% | 255 |

I claim:
1. In a method for microbiologically producing β-carotene in a submerged aerobic fermentation using *Blakeslea trispora*, the improvement which comprises incorporating at least about 7½% of citrus molasses in a β-carotene fermentation medium.

2. In a method for microbiologically producing β-carotene in a submerged aerobic fermentation using *Blakeslea trispora*, the improvement which comprises incorporating at least about 7⅓% of citrus molasses in a β-carotene fermentation medium comprising non-hydrolyzed soybean meal, corn steep liquor, cotton seed oil, and deobase, and recovering the β-carotene so produced.

3. In a method for microbiologically producing β-carotene in a submerged aerobic fermentation using *Blakeslea trispora*, the improvement which comprises the use of a fermentation medium consisting of the following ingredients:

| | Gm./l. |
|---|---|
| Soybean meal (non-hydrolyzed) | 25 |
| Citrus molasses | 120 |
| Corn steep liquor | 20 |
| Cottonseed oil | 50 |
| Deobase | 50 |

Water, q.s. to 1 liter.

and adjusting the pH to 6.0 to 7.5 with NaOH before sterilization.

References Cited

UNITED STATES PATENTS

| | | | |
|---|---|---|---|
| 3,013,948 | 12/1961 | Hoffmann et al. | 195—114 |
| 3,079,380 | 2/1963 | Ciegler et al. | 195—28 X |
| 3,291,701 | 12/1966 | Fulde | 195—28 |

ALVIN E. TANENHOLTZ, Primary Examiner